United States Patent
Hwang et al.

(10) Patent No.: US 9,473,247 B2
(45) Date of Patent: Oct. 18, 2016

(54) OPTICAL SIGNAL CONVERSION DEVICE AND METHOD THEREOF

(71) Applicant: NATIONAL CHENG KUNG UNIVERSITY, Tainan (TW)

(72) Inventors: Sheng-Kwang Hwang, Tainan (TW); Yu-Han Hung, Chiayi (TW); Cheng-Hao Chu, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 63 days.

(21) Appl. No.: 14/266,066

(22) Filed: Apr. 30, 2014

(65) Prior Publication Data
US 2015/0280830 A1 Oct. 1, 2015

(30) Foreign Application Priority Data
Nov. 1, 2013 (TW) .............................. 102139682 A

(51) Int. Cl.
| H04B 10/00 | (2013.01) |
| H04B 10/04 | (2006.01) |
| H04B 10/516 | (2013.01) |
| H04B 10/50 | (2013.01) |
| H04B 10/2513 | (2013.01) |
| H04B 10/2575 | (2013.01) |

(52) U.S. Cl.
CPC ........ *H04B 10/5165* (2013.01); *H04B 10/504* (2013.01); *H04B 10/5161* (2013.01); *H04B 10/2513* (2013.01); *H04B 10/2575* (2013.01)

(58) Field of Classification Search
CPC .................. H04B 10/25752; H04B 10/25752; H04B 10/2575
See application file for complete search history.

(56) References Cited

U.S. PATENT DOCUMENTS

| 6,813,288 B2 * | 11/2004 | Kim ...................... H01S 5/4006 372/18 |
| 9,020,360 B2 * | 4/2015 | Stiffler ............... H04B 10/5165 398/115 |
| 2003/0231601 A1 * | 12/2003 | Kim ................. H04B 10/25752 370/277 |

(Continued)

OTHER PUBLICATIONS

Chan et al., Radio-over-fiber AM-to-FM upconversion using an optically injected semiconductor laser, 2006, Optical Society of America, Optics Letters, vol. 31, No. 15, pp. 2254-2256.*

(Continued)

*Primary Examiner* — Ken N Vanderpuye
*Assistant Examiner* — Jai Lee
(74) *Attorney, Agent, or Firm* — Muncy, Geissler, Olds & Lowe, P.C.

(57) ABSTRACT

The present invention relates to a device and a method for conversion from optical double-sideband modulation signals to optical single-sideband modulation signals. Period-one nonlinear dynamics of semiconductor lasers is utilized to achieve such optical signal conversion. Only a typical semiconductor laser is required as the key conversion unit. The microwave and data quality are maintained or even improved after conversion, increasing detection sensitivity, transmission distance, and link gain of the communication networks. The device is relatively less sensitive to ambient variations, can be self-adapted to changes in operating conditions, and can be applied for a broad range of operating microwave frequency up to at least 80 GHz and a high data rate up to at least 2.5 Gbits/s. The device can therefore be dynamically reconfigured for different communication networks adopting different operating microwave frequencies and different data rates.

10 Claims, 15 Drawing Sheets

(56) References Cited

U.S. PATENT DOCUMENTS

| | | | |
|---|---|---|---|
| 2006/0126149 A1* | 6/2006 | Sellars | G11C 13/044 359/237 |
| 2008/0232799 A1* | 9/2008 | Kim | H04B 10/25752 398/41 |
| 2011/0044692 A1* | 2/2011 | Chan | H04B 10/25752 398/115 |
| 2014/0270783 A1* | 9/2014 | Prather | H04B 10/25752 398/115 |

OTHER PUBLICATIONS

Chan et al., Period-one oscillation for photonic microwave transmission using an optically injected semiconductor laser, 2007, Optical Society of America, Optics Express, vol. 15, No. 22, pp. 14921-14935.*

Ramaswami et al., Optical Networks: A Practical Perspective, 2010, Elsevier Inc., 3rd Ed., pp. 192-193.*

Thomas et al., Communication Theory, 2006, Tata McGraw-Hill Publishing Company Limited, pp. 52-55.*

Woodward et al., Fiber Optics Installer and Technician Guide, 2005, Neil Edde, pp. 280-284.*

Ye et al, Performance Improvement in Radio-over-Fiber Transmission Using Pre-distorted Double-Sideband Signals, Mar. 2013, Optical Society of America, pp. 1-3.*

Chan et al., Radio-over-fiber AM-to-FM upconversion using an optically injected semiconductor laser, 2006, Optical Society of America, pp. 2254-2256.*

Ye et al., Performance Improvement in Radio-over-Fiber Transmission Using Pre-distorted Double-Sideband Signals, 2013, Optical Society of America.*

Period-one oscillation for photonic microwave transmission using an optically injected semiconductor laser, 2007, Optical Society of America, pp. 14921-14935.*

* cited by examiner

OPTICAL SIGNAL CONVERSION DEVICE AND METHOD THEREOF

CROSS-REFERENCE TO RELATED APPLICATION

This application claims priority from Taiwan Patent Application No. 102139682, filed on Nov. 1, 2013 in Taiwan Intellectual Property Office, the contents of which are hereby incorporated by reference in their entirety.

BACKGROUND OF THE INVENTION

1. Field of the Invention

The present invention relates to a device and a method for conversion from optical double-sideband modulation (DSB) signals to optical single-sideband modulation (SSB) signals by using, particularly, period-one (P1) nonlinear dynamics of semiconductor lasers.

2. Description of the Related Art

Communication networks are generally classified into wireless networks and wireline networks. In the wireless networks, microwaves are used as carriers to deliver data through air to provide communication between mobile electronic devices. In the wireline networks based on optical technologies, optical waves function as carriers to deliver data through optical fibers to provide communication between immobilized electronic devices. These two networks depend on completely different communication approaches and cover completely different communication scopes. Due to the rapid advances of broadband wireless technologies and also due to the various developments of online applications, the capacity demand for data transmission in the wireless networks increases considerably. If the wireless networks are required to manage both the front-end data transmission between users and wireless base stations and the back-end data transmission between the wireless base stations and central offices, currently developed broadband wireless technologies are not capable of meeting the vast capacity demand for data transmission when the wireless networks are simultaneously accessed by a variety of different users or devices.

Since each channel of the wireline networks based on optical technologies provides data transmission capacity of the order of a few Gbits/s to tens of Gbits/s, the optical communication networks are highly suitable to work as backbones for huge back-end data transmission for various network applications. Therefore, radio-over-fiber (RoF) networks which integrate the wireless networks (responsible for front-end data transmission) and the optical wireline networks (responsible for back-end data transmission) have become very attractive for the next generation of communication technology and system. RoF is a promising approach in distributing microwaves over long distances through optical fibers for antenna remoting applications, such as broadband wireless access networks. The RoF networks adopt an architecture where microwaves are generated in the optical domain at central offices and next transmitted to remote wireless base stations through optical fibers. Microwaves are converted to the electrical domain at the wireless base stations using photodetectors, which are next radiated by antennas over small areas.

Since the RoF networks attempt to integrate two different conventional networks, how to superimpose microwaves on optical waves for optical fiber distribution and how to solve physical challenges encountered by the microwave-superimposed optical waves travelling over optical fibers require a number of different functionalities for microwave signal processing. In addition, to reduce construction cost, to expand coverage area, and to increase data capacity, future wireless base stations will be reduced in size, simplified in structure, and developed for high-frequency (such as from 10 GHz to 100 GHz) microwave radiation. Therefore, plenty of microwave signal processing functionalities, which are conventionally carried out using electronic technologies in the wireless base stations, will instead be carried out using optical technologies in the central offices for the RoF networks.

To generate microwaves in the optical domain, direct or external modulation of semiconductor lasers is typically adopted to superimpose microwaves on optical waves. However, either direct or external modulation scheme generates optical double-sideband modulation (DSB) signals, which suffer from significant microwave power fading due to chromatic dispersion over fiber distribution. This microwave power fading effect considerably degrades the communication quality of the RoF networks. To improve the communication quality, the optical DSB signals need to be converted into optical single-sideband modulation (SSB) signals before fiber distribution in order to mitigate the dispersion-induced microwave power fading.

One method for the aforementioned optical DSB-to-SSB conversion uses optical filters to suppress one frequency component of the optical DSB signals. However, the optical power of the optical SSB signals is significantly reduced due to the power loss of the filtering process. Therefore, optical amplifiers are generally required to compensate for the power loss, which results in significant amount of unnecessary power loss and which increases the complexity of the device structure. In addition, since the central frequency and the pass-band of the optical filters are typically fixed, the conversion device cannot be reconfigured dynamically for different RoF networks adopting different operating microwave frequencies. Another method for the optical DSB-to-SSB conversion simultaneously applies microwaves with different phases to externally modulate semiconductor lasers. Since careful control of phase difference between the microwaves is required, this conversion device needs to be highly stable under possible ambience variation or operating condition adjustment. Therefore, the complexity of the structure and operation for this conversion device is high.

Consequently, how to improve the aforementioned conversion methods and devices or how to develop other conversion methods and devices with better device performance, simpler device structure, and/or easier device operation has become the focus of the people working in related areas and the emphasis of the present invention.

SUMMARY OF THE INVENTION

According to the problems and challenges encountered in prior arts, the purpose of the present invention is to provide a device and a method for conversion from optical double-sideband modulation (DSB) signals to optical single-sideband modulation (SSB) signals.

The method of the present invention for the aforementioned optical DSB-to-SSB conversion includes the following steps:

(1) using a microwave-modulated optical signal generation module to generate an optical double-sideband modulation (DSB) signal, (2) using an optical power adjuster to adjust the optical power of the optical double-sideband modulation (DSB) signal, (3) using an optical polarization controller to adjust the polarization of the optical double-sideband modulation (DSB) signal, (4) using an optical path controller to unidirectionally direct the optical double-sideband modulation (DSB) signal toward a semiconductor laser, (5) using the semiconductor laser to convert the optical double-sideband modulation (DSB) signal into an optical single-sideband modulation (SSB) signal by using period-one (P1) nonlinear dynamics of the semiconductor laser, and (6) using the optical path controller to unidirectionally direct the optical single-sideband modulation (SSB) signal toward an output port of the device of the present invention.

Based on the method, the device of the present invention mainly includes a semiconductor laser. The semiconductor laser receives an optical DSB signal with equal power for both modulation sidebands. The P1 nonlinear dynamics of the semiconductor laser is induced by the optical DSB signal and is used to carry out the optical DSB-to-SSB conversion. An optical SSB signal with the power of one modulation sideband higher than that of the other modulation sideband is therefore generated at the output of the semiconductor laser.

Based on the device, only a semiconductor laser is required as the key conversion unit for the present invention, which could be a Fabry Perot laser, a distributed feedback laser, a vertical cavity surface emitting laser, a quantum-well laser, a quantum-dash laser, or a quantum-dot laser. In addition, the device of the present invention is relatively less sensitive to ambient variations and can be self-adapted to changes in operating conditions. The device of the present invention is therefore highly stable with a relatively simple structure, which may result in low construction cost and maintenance expense.

The method of the present invention ensures that, after conversion, the microwave and data quality are maintained or even improved, which increases detection sensitivity, transmission distance, and link gain of the radio-over-fiber (RoF) networks.

The method of the present invention can be applied for a broad range of microwave frequency up to at least 80 GHz and for a high data rate up to at least 2.5 Gbits/s, which are not limited by the bandwidths and parasitics of electronics generally encountered by other conversion methods. The device of the present invention can therefore be dynamically reconfigured for different RoF networks adopting different operating microwave frequencies or/and different data rates.

The aforementioned purposes, characteristics, and advantages of the present invention are more fully described with preferred embodiments and drawings as follows.

BRIEF DESCRIPTION OF THE DRAWINGS

The device structure, operating principle, and advantageous characteristics of the present invention are described with more details hereinafter with reference to the accompanying drawings that show various embodiments of the present invention as follows.

DETAILED DESCRIPTION OF THE PREFERRED EMBODIMENTS

To illustrate the device structure, operating principle, and advantageous characteristics of the present invention, a preferred embodiment and the corresponding drawings are provided with more details. The purpose of the drawings being used is for illustration, and they are not necessarily the real proportion and precise allocation of the embodiments of the present invention. Therefore, they should not be used to limit the privilege coverage of the practical embodiments of the present invention.

Figure 1:
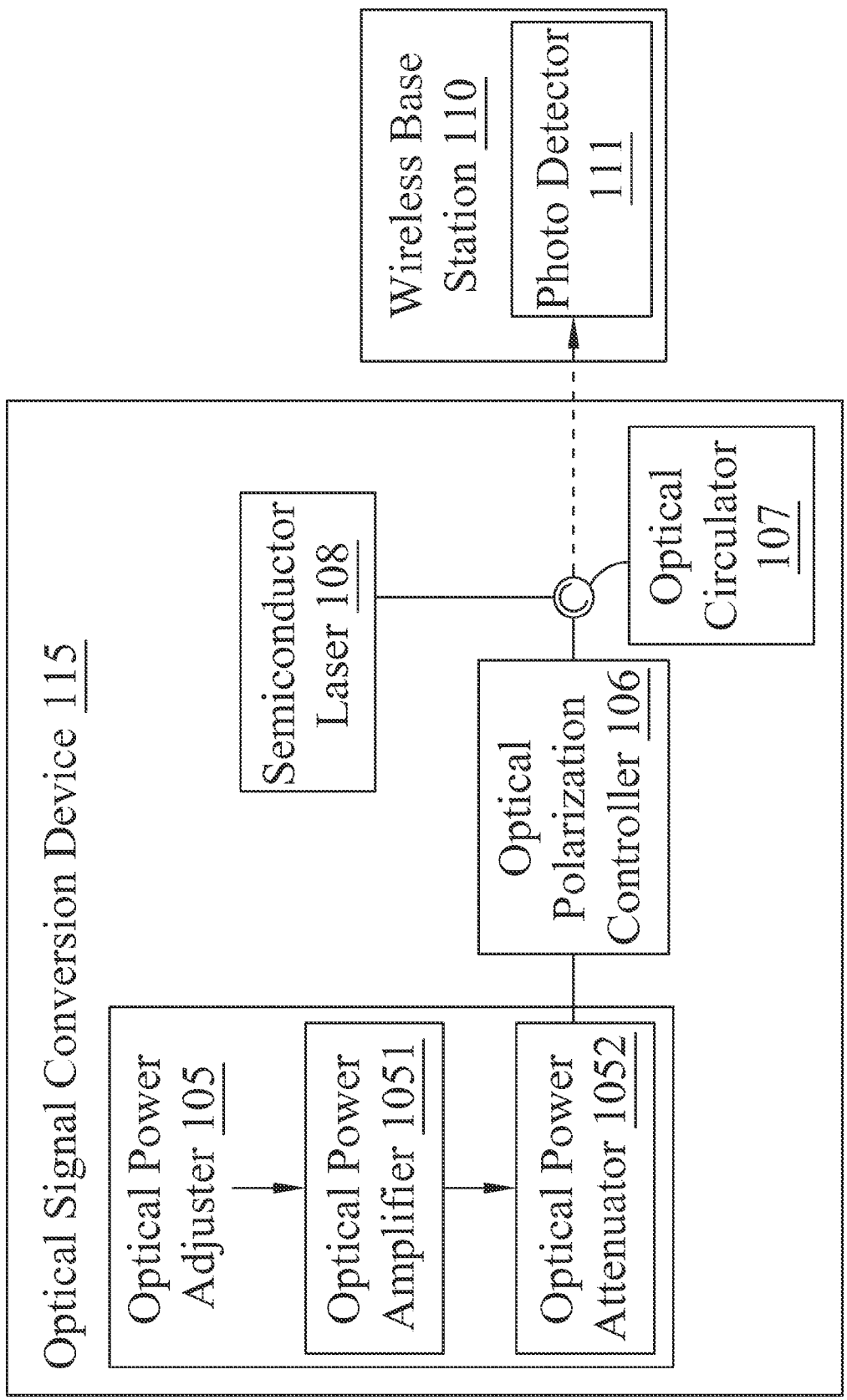
FIG. 1 is a schematic representation of an optical signal conversion device according to a preferred embodiment of the present invention.

Referring to FIG. 1, FIG. 1 shows a schematic representation of an optical signal conversion device according to a preferred embodiment of the present invention. An optical signal conversion device of the present invention 115 includes an optical power adjuster 105, an optical polarization controller 106, and a semiconductor laser 108. The optical power adjuster 105 includes an active optical component to amplify optical power of an optical input, and a passive optical component to attenuate the optical power of the optical input. An optical input is an optical double-sideband modulation (DSB) signal with equal power for both modulation sidebands. In the present embodiment, the active optical component is an optical power amplifier 1051 and the passive optical component is an optical power attenuator 1052.

An optical polarization controller 106 adjusts the polarization of the optical input.

The semiconductor laser 108 converts the optical input into an optical output by using period-one (P1) nonlinear dynamics of the semiconductor laser 108, where the optical output is an optical single-sideband modulation (SSB) signal with the power of one modulation sideband higher than that of the other modulation sideband. An optical path controller 107 connected to the semiconductor laser 108 is used to unidirectionally direct the optical input toward the semiconductor laser 108 and to unidirectionally direct the optical output toward an output port of the device of the present invention 115. In the present embodiment, the optical path controller 107 is an optical circulator.

Based on the above, the device of the present invention 115 converts an optical DSB signal into an optical SSB signal, and the key of the device 115 is the semiconductor laser 108. The output of the device 115 is sent to a wireless base station 110 and is converted into a microwave signal by a photodetector 111 for radiation.

Figure 2:
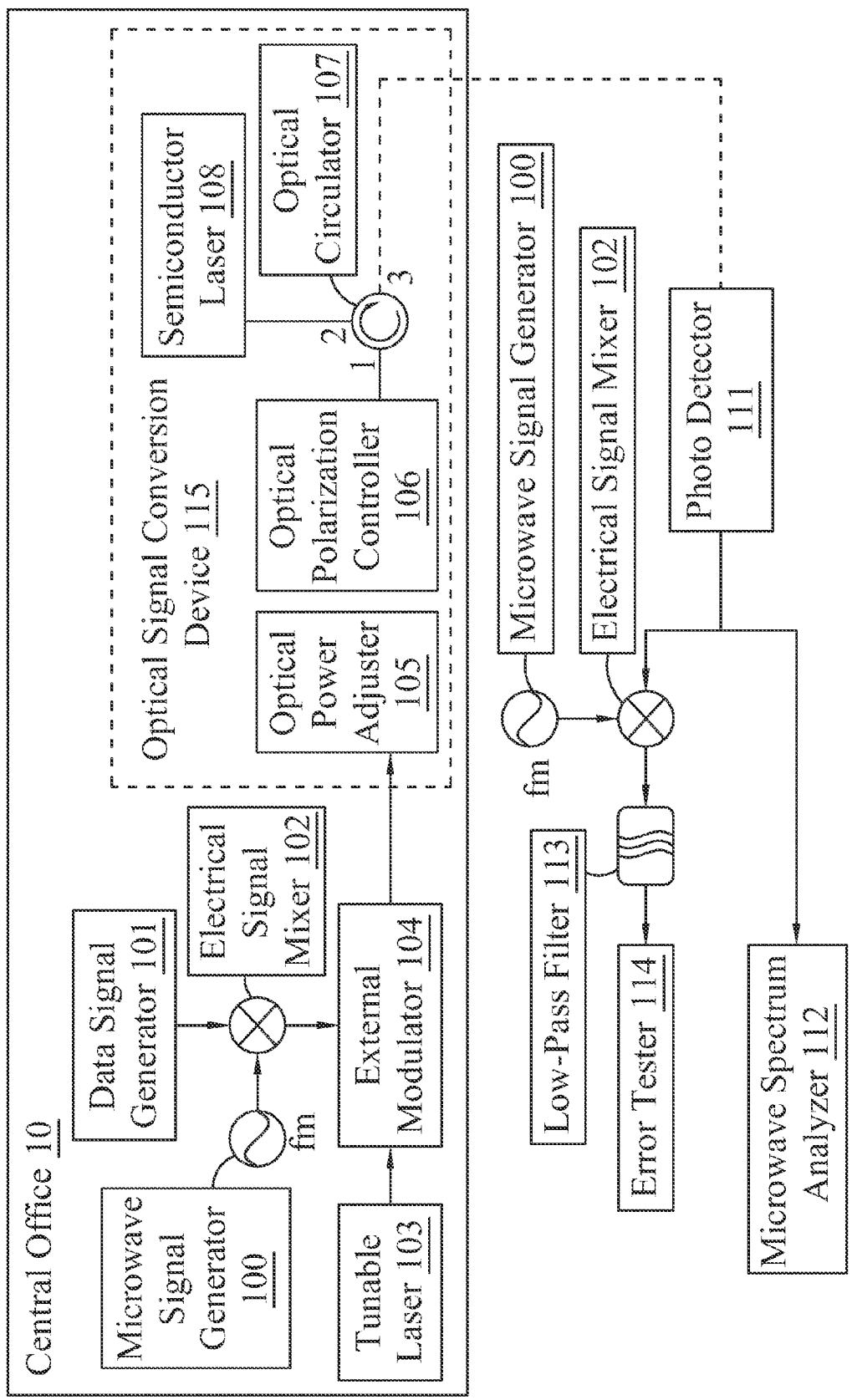
FIG. 2 is a schematic representation of how the optical signal conversion device is used in an central office of radio-over-fiber (RoF) networks according to the present invention.
Figure 3A:
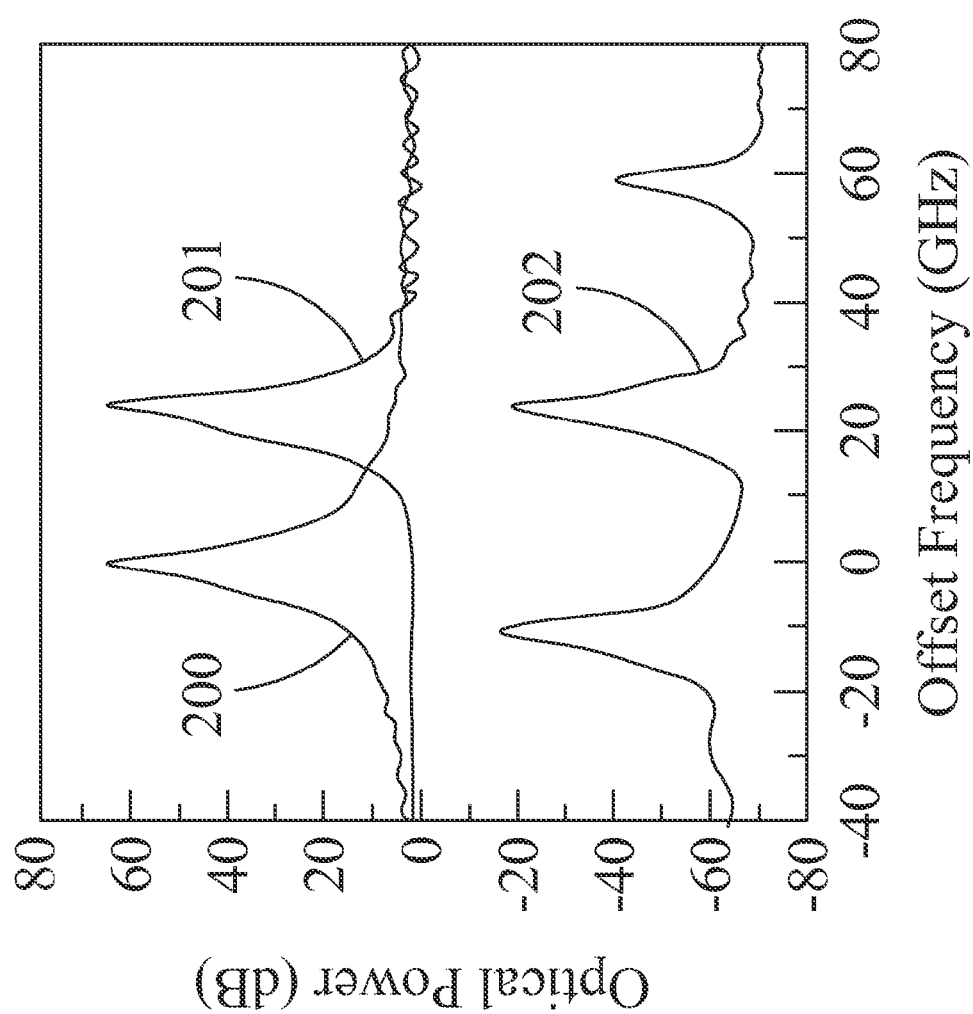
FIG. 3A shows optical spectra of a semiconductor laser under the period-one (P1) nonlinear dynamics and under the free-running condition, respectively, according to the present invention.

Referring to FIG. 2 and FIG. 3A, FIG. 2 is a schematic representation of how the optical signal conversion device 115 is used in an central office of radio-over-fiber (RoF) networks according to the present invention, and FIG. 3A shows optical spectra of the semiconductor laser 108 under the period-one (P1) nonlinear dynamics and under the free-running condition, respectively, according to the present invention. The x-axis is relative to the free-running frequency of the semiconductor laser 108. In another embodiment, the optical signal conversion device 115 is used in a central office 10 of RoF networks. An optical continuous-wave (CW) signal is generated by a tunable laser 103. A microwave signal at a frequency $f_m$ is added to the optical CW signal through an external modulator 104 with a microwave signal generator 100 to form an optical DSB signal. An electrical signal mixer 102 superimposes data from a data signal generator 101 on the microwave signal. When only the optical CW signal (curve 201 in FIG. 3A) injects into the semiconductor laser 108, a regeneration of the optical CW signal appears resulting from injection pulling (curve 202 in FIG. 3A). In addition, oscillation sidebands equally separated from the regeneration by an oscillation frequency $f_0$=35 GHz emerge (curve 202 in FIG. 3A) because of the P1 nonlinear dynamics of the semiconductor laser 108. The power of the lower-frequency oscillation sideband is typically much higher than that of the upper-frequency oscillation sideband, attributed to the resonance enhancement of the red-shifted laser cavity caused by the injection. By taking advantage of this intensity asymmetry, conversion from optical DSB signals to optical SSB signals can be achieved. To quantify the asymmetry, a sideband rejection ratio, SRR, is defined as the relative power of the lower-frequency oscillation sideband to the upper-frequency one. Accordingly, the SRR value for the curve 202 in FIG. 3A is 23 dB.

In the present invention, the level and frequency of an optical injection, either the optical CW signal or the optical DSB signal, into the semiconductor laser 108 can be adjusted by the optical power adjuster 105 and the tunable laser 103, respectively. A change in either the injection level or the injection frequency varies both the oscillation frequency $f_0$ and the oscillation sideband asymmetry SRR, leading to different characteristics of the P1 nonlinear dynamics of the semiconductor laser 108. Referring to FIG. 1, the optical power adjuster 105 may include an active optical component, namely the optical power amplifier 1051, and a passive optical component, namely the optical power attenuator 1052. In another embodiment, a single optical power attenuator may be good enough without the need of an optical power amplifier in the optical power adjuster 105. In the present embodiment, $\xi_i$ indicates the injection level and $f_i$ represents the injection frequency detuned from the free-running frequency of the semiconductor laser 108, respectively. To properly induce the P1 nonlinear dynamics of the semiconductor laser, the polarization of the optical CW signal is aligned with that of the semiconductor laser 108 through the optical polarization controller 106.

Figure 3B:
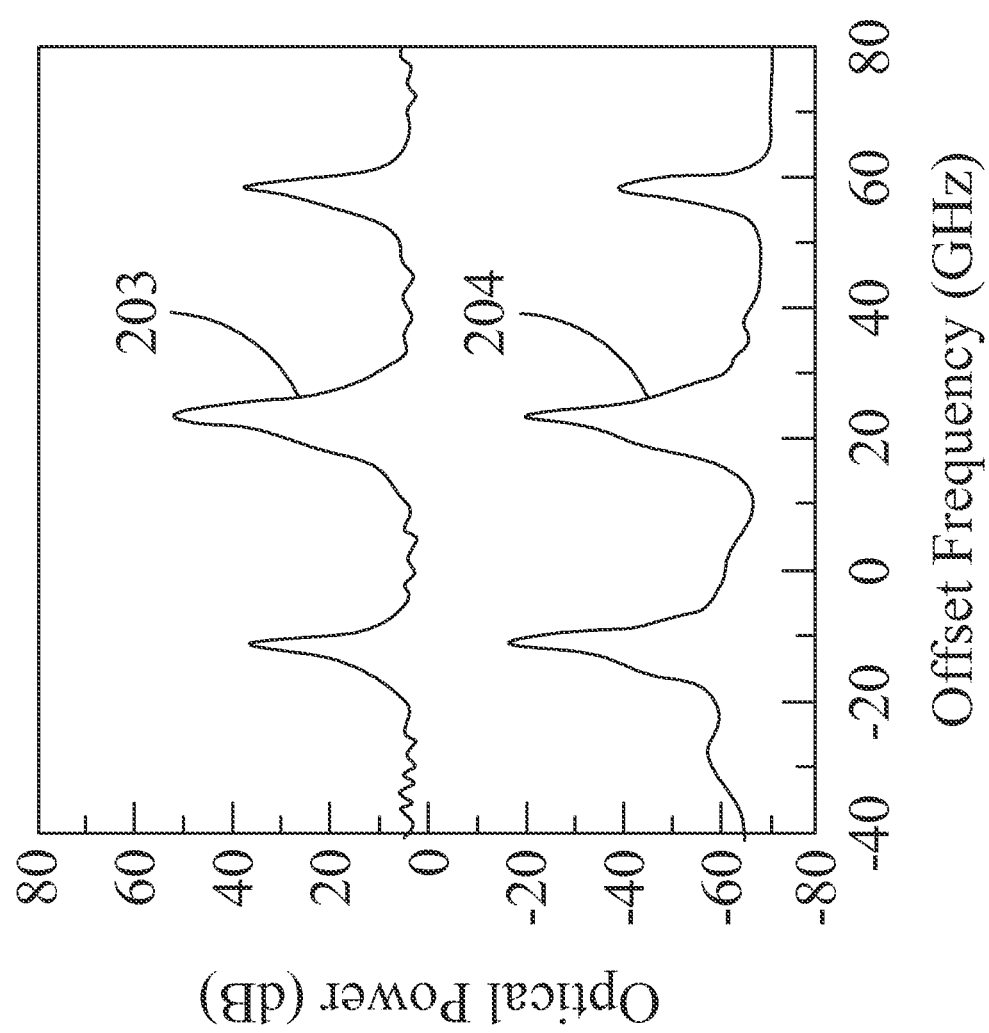
FIG. 3B shows optical spectra of an optical double-sideband modulation (DSB) signal and an optical single-sideband modulation (SSB) signal, respectively, without encoded data when $f_m = f_0 = 35$ GHz according to the present invention.

Referring to FIG. 2 and FIG. 3B, FIG. 3B shows optical spectra of an optical double-sideband modulation (DSB) signal and an optical single-sideband modulation (SSB) signal, respectively, without encoded data when $f_m=f_0=35$ GHz according to the present invention. When the microwave signal at $f_m$ is added to the optical CW signal through the external modulator 104, the optical DSB signal is generated (curve 203 in FIG. 3B), where two modulation sidebands of equal power appear around the regeneration of the optical CW signal by the microwave frequency $f_m$. Note that $f_m=f_0=35$ GHz is adopted for the demonstration in the curve 203 of FIG. 3B. By sending the optical DSB signal into the semiconductor laser 108 under the same $\xi_i$ and $f_i$ used to generate the curve 202 in FIG. 3A, the optical DSB signal is converted into the optical SSB signal with SRR=22 dB (curve 204 in FIG. 3B), attributed to the P1 nonlinear dynamics of the semiconductor laser 108. The optical SSB signal is capable of mitigating the microwave power fading effect over optical fiber distribution.

Figure 3C:
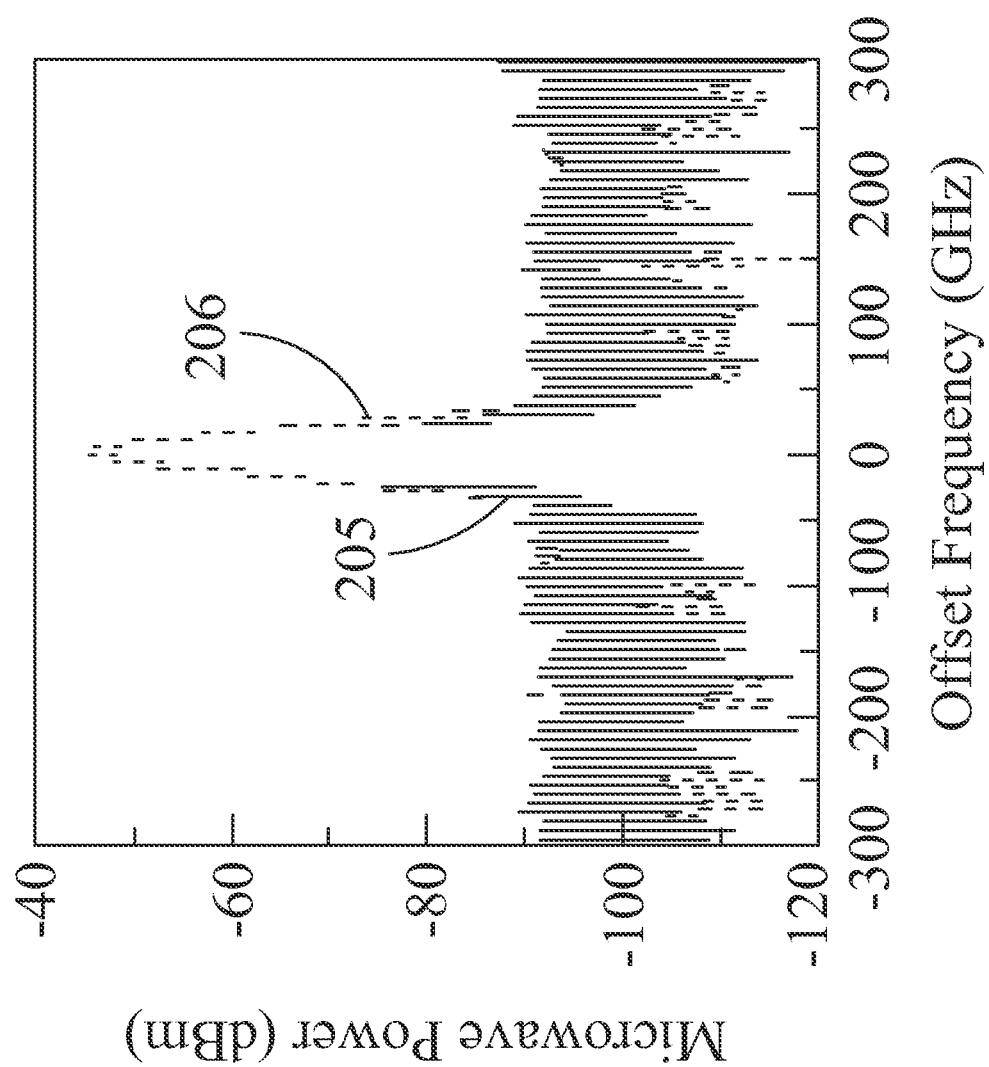
FIG. 3C shows microwave spectra of the optical double-sideband modulation (DSB) signal and the optical single-sideband modulation (SSB) signal, respectively, without encoded data when $f_m = f_0 = 35$ GHz according to the present invention.

Referring to FIG. 3C, FIG. 3C shows microwave spectra of the optical double-sideband modulation (DSB) signal and the optical single-sideband modulation (SSB) signal, respectively, without encoded data when $f_m=f_0=35$ GHz according to the present invention. When the optical DSB signal (curve 203 in FIG. 3B) is sent directly to a photodetector 111, a 35 GHz microwave signal is generated (curve 205 in FIG. 3C). Similarly, when the optical SSB signal (curve 204 in FIG. 3B) is sent directly into the photodetector 111, a 35 GHz microwave signal is also generated (curve 206 in FIG. 3C). Comparing the curves 205 and 206 demonstrates that, after the aforementioned optical DSB-to-SSB conversion, the microwave quality, including linewidth, phase noise, and power, is mainly preserved.

Figure 3D:
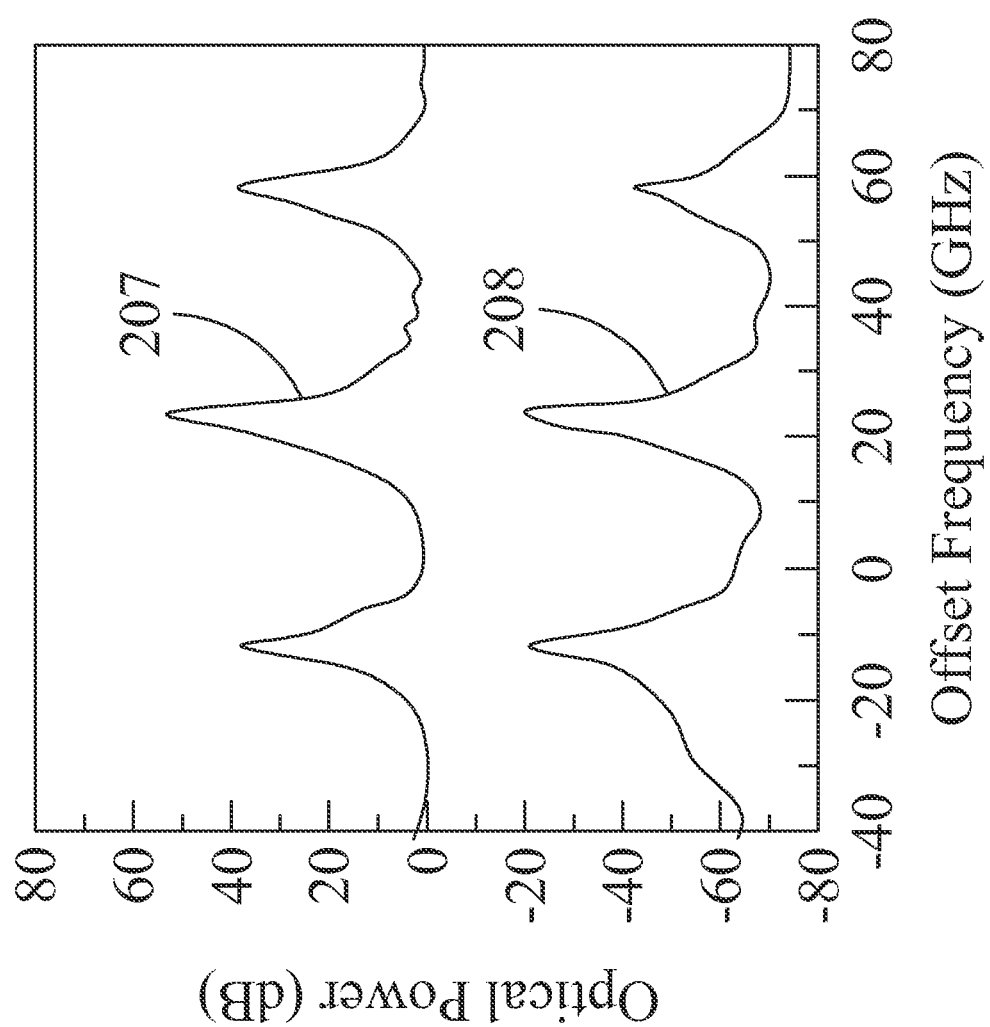
FIG. 3D shows optical spectra of an optical double-sideband modulation (DSB) signal and an optical single-sideband modulation (SSB) signal, respectively, with encoded data when $f_m = f_0 = 35$ GHz according to the present invention.

Referring to FIG. 2, data with a bit rate of 622 Mbps from the data signal generator 101 can be superimposed on the microwave signal from the microwave signal generator 100 by the electrical signal mixer 102. By adding this data-encoded microwave to the optical CW signal from the tunable laser 103 through the external modulator 104, a data-encoded optical DSB signal is generated (curve 207 in FIG. 3D). By sending this data-encoded optical DSB signal into the semiconductor laser 108 under the same $\xi_i$ and $f_i$ used to generate the curve 202 in FIG. 3A, a data-encoded optical SSB signal is generated (curve 208 in FIG. 3D). Note that $f_m=f_0=35$ GHz is kept the same for FIG. 3D. Comparing FIG. 3D and FIG. 3B demonstrates that, after the optical DSB-to-SSB conversion, spectral structures and characteristics of the optical DSB signal with data encoding are highly similar to that without data encoding, indicating that the conversion performance is not affected by the data encoding process. Therefore, a higher bit rate of data, such as 1.25 Gbps or 2.5 Gbps, is feasible for the optical DSB-to-SSB conversion using the device of the present invention.

Figure 4:
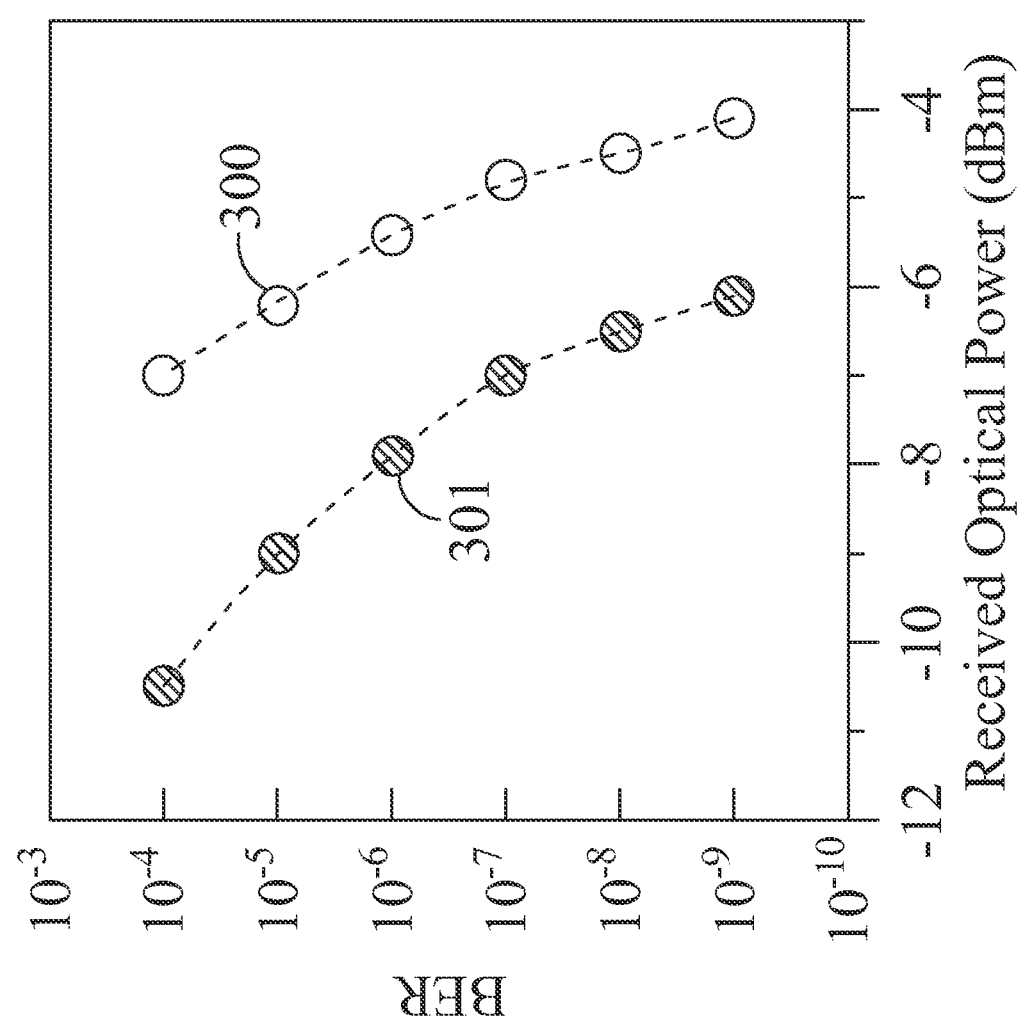
FIG. 4 shows bit-error ratios of the optical double-sideband modulation (DSB) signal and the optical single-sideband modulation (SSB) signal, respectively, with 622 Mbps encoded data when $f_m = f_0 = 35$ GHz according to the present invention.

To demonstrate the data quality, the bit-error ratio (BER) analysis is conducted. The optical signals of the curves 207 and 208 are sent to the photodetector 111 to retrieve the data-encoded microwave signals. The data-encoded microwave signals are next sent to an electrical signal mixer 102 to mix with a microwave reference at $f_m$ from a microwave signal generator 100 for data retrieval. The retrieved data are first electrically filtered by a low-pass filter 113 and are next sent to an error tester 114 for BER calculation. Referring to FIG. 4, FIG. 4 shows bit-error ratios of the optical double-sideband modulation (DSB) signal (curve 300) and the optical single-sideband modulation (SSB) signal (curve 301), respectively, with 622 Mbps encoded data when $f_m=f_0=35$ GHz according to the present invention. Comparing the curves 301 and 302 demonstrates that, after the optical DB-to-SSB conversion, not only similar BER behavior is achieved but also improved detection sensitivity is possible.

As demonstrated above, the device of the present invention enables optical DBS-ti-SSB conversion when $f_m=f_0$, of which microwave and data quality are mainly preserved or even improved. If a different $f_m$ is required for a different RoF network, the device of the present invention also works under the same $\xi_i$ and $f_i$, that is, when $f_m \neq f_0$, of which microwave and data quality are also maintained.

Figure 5A:
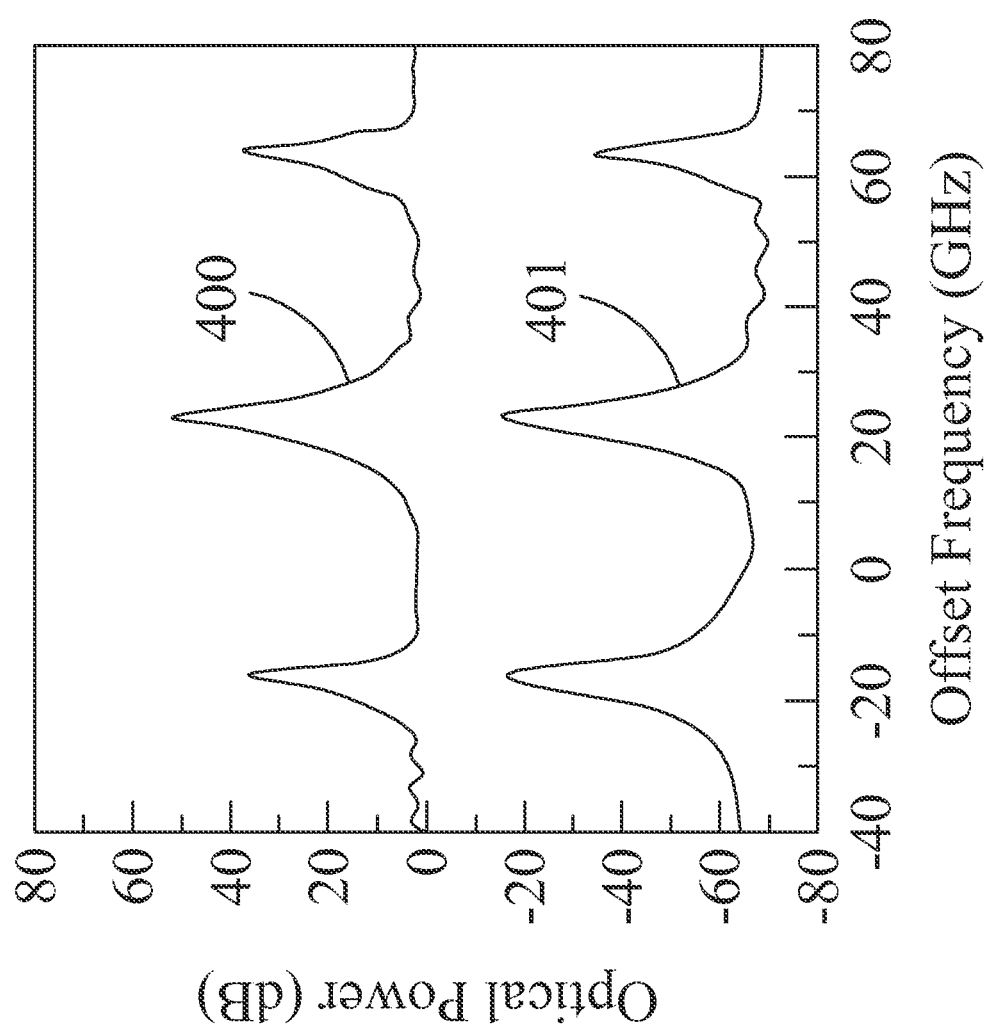
FIG. 5A shows optical spectra of an optical double-sideband modulation (DSB) signal and an optical single-sideband modulation (SSB) signal, respectively, without encoded data when $f_m = 40$ GHz$\neq f_0 = 35$ GHz according to the present invention.
Figure 5B:
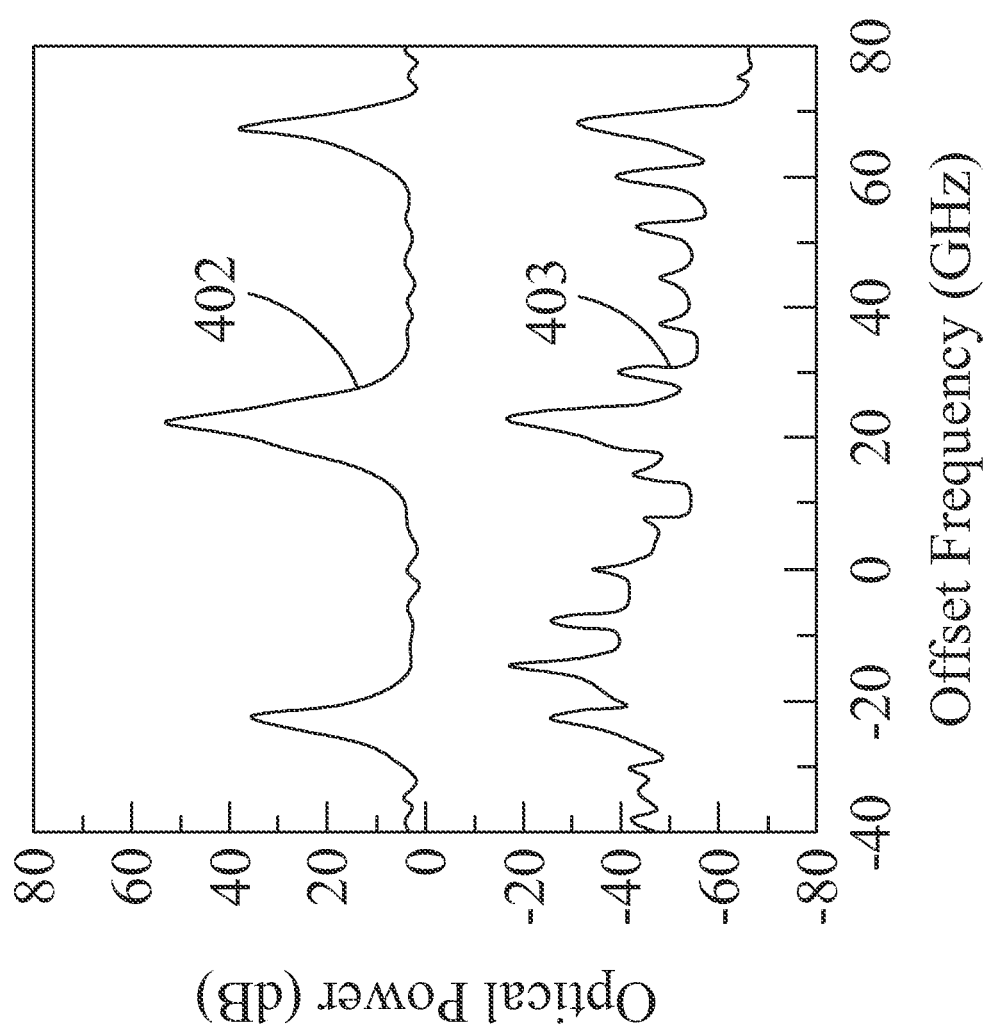
FIG. 5B shows optical spectra of an optical double-sideband modulation (DSB) signal and a nonlinear wave-mixing signal, respectively, without encoded data when $f_m = 45$ GHz$\neq f_0 = 35$ GHz according to the present invention.

Referring to FIG. 5A, FIG. 5A shows optical spectra of an optical double-sideband modulation (DSB) signal (curve 400) and an optical single-sideband modulation (SSB) signal (curve 401), respectively, without encoded data when $f_m=40$ GHz$\neq f_0=35$ GHz according to the present invention. Under the same; and used to generate the curve 202 in FIG. 3A where $f_0=35$ GHz, an optical DSB signal at $f_m=40$ GHz (curve 400) can be successfully converted into an optical SSB signal also at $f_m=40$ GHz (curve 401) with a similar SSB features as previously demonstrated. Not only the microwave quality is similarly kept, but also the data quality is maintained after the conversion. This indicates that the device of the present invention can be dynamically reconfigured for different RoF networks adopting different operating microwave frequencies. Referring to FIG. 5B, FIG. 5B shows optical spectra of an optical double-sideband modulation (DSB) signal (curve 402) and a nonlinear wave-mixing signal (curve 403), respectively, without encoded data when $f_m=45$ GHz$\neq f_0=35$ GHz according to the present invention. Under the same $\xi_i$ and $f_i$ used to generate the curve 202 in FIG. 3A where $f_0=35$ GHz, an optical DSB signal at $f_m=45$ GHz (curve 402) only results in a nonlinear wave-mixing signal (curve 403). This demonstrates that if the difference between $f_m$ and $f_0$ goes beyond a certain range, the optical DSB-to-SSB conversion cannot be successfully carried out. In the present embodiment, stable and successful optical DSB-to-SSB conversion can be achieved for $f_m$ ranging from 30 to 42 GHz.

As demonstrated above, the device of the present invention enables optical DBS-ti-SSB conversion for both $f_m=f_0$ and $f_m \neq f_0$ if $\xi_i$ and $f_i$ are meant to keep the same. If either $\xi_i$ or $f_i$ fluctuates due to possible ambient variation, where a different $f_0$ is induced, the device of the present invention also works when $f_i$ is meant to keep the same for a RoF network.

Figure 5C:
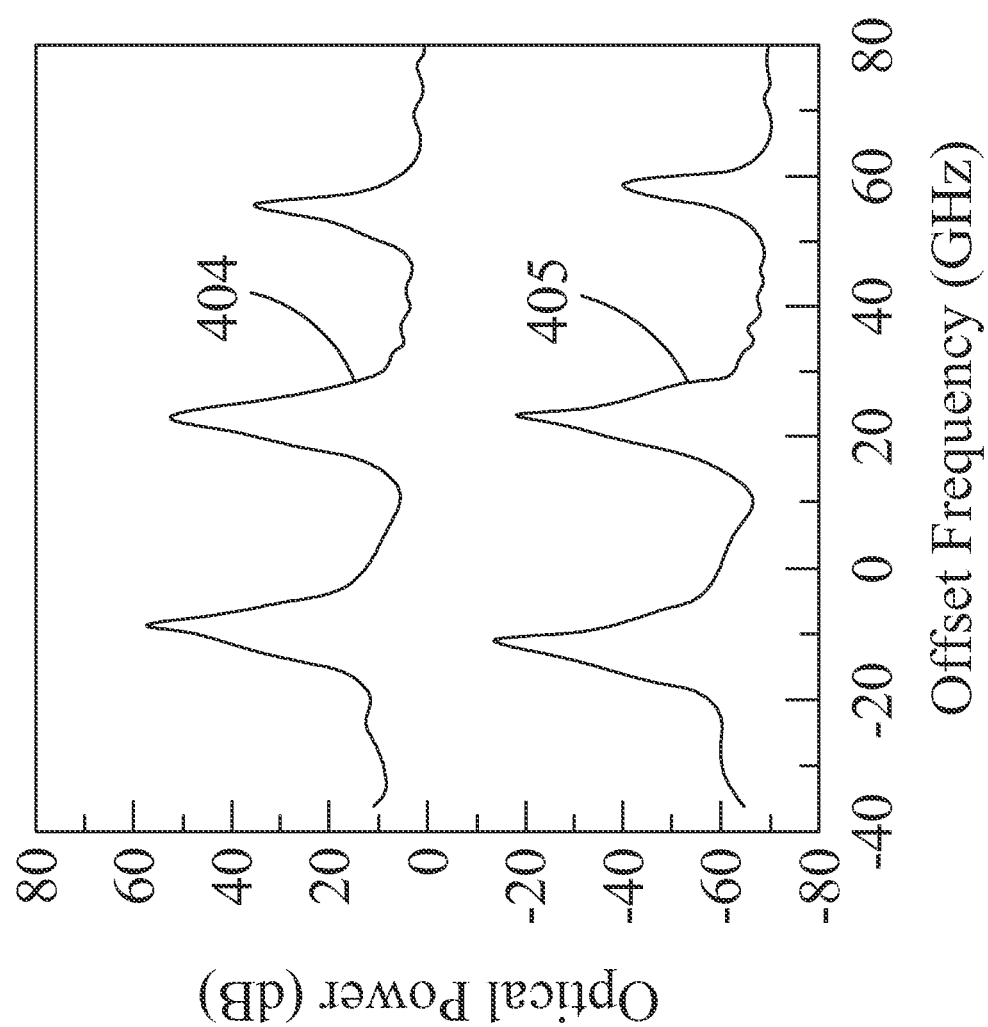
FIG. 5C shows optical spectra of the period-one (P1) nonlinear dynamics of the semiconductor laser at $f_0 = 30$ GHz and an optical single-sideband modulation (SSB) signal at $f_m = 35$ GHz without encoded data, respectively, according to the present invention.
Figure 5D:
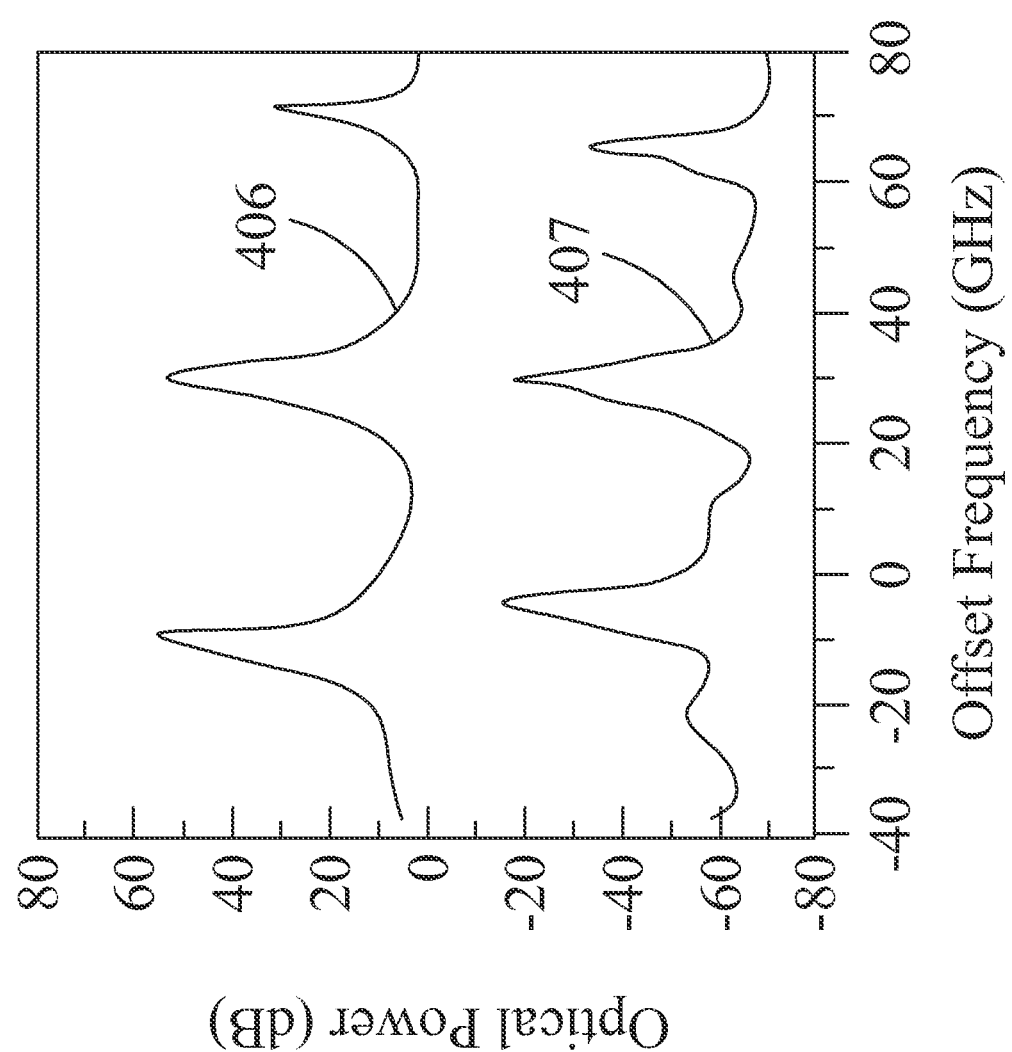
FIG. 5D shows optical spectra of the period-one (P1) nonlinear dynamics of the semiconductor laser at $f_0 = 40$ GHz and an optical single-sideband modulation (SSB) signal at $f_m = 35$ GHz without encoded data, respectively, according to the present invention.

Referring to FIG. 5C, FIG. 5C shows optical spectra of the period-one (P1) nonlinear dynamics of the semiconductor laser at $f_0=30$ GHz (curve 404) and an optical single-sideband modulation (SSB) signal at $f_m=35$ GHz without encoded data (curve 405), respectively, according to the present invention. A reduction of $\xi_i$ leads to a different feature of the P1 nonlinear dynamics with $f_0=30$ GHz (curve 404 in FIG. 5C). Referring to FIG. 5D, FIG. 5D shows optical spectra of the period-one (P1) nonlinear dynamics of the semiconductor laser at $f_0=40$ GHz (curve 406) and an optical single-sideband modulation (SSB) signal at $f_m=35$ GHz without encoded data (curve 407), respectively, according to the present invention. An enhancement of $f_i$ results in a different feature of the P1 nonlinear dynamics with $f_0=40$ GHz (curve 406 in FIG. 5D). If the optical DSB signal at $f_m=35$ GHz (curve 203 in FIG. 3B) injects into the semiconductor laser 108 using the values of $\xi_i$ and $f_i$ for the curve 404 in FIG. 5C and 406 in FIG. 5D, respectively, optical SSB signals can be successfully obtained also at $f_m=35$ GHz (curve 405 in FIG. 5C and the curve 407 in FIG. 5D, respectively). Not only the microwave quality is similarly kept, but also the data quality is maintained after the conversion. This indicates that the device of the present invention 115 can operate stably under certain fluctuations in either $\xi_i$ or $f_i$ and therefore is relatively less sensitive to the ambient variation. If either $\xi_i$ or $f_i$ varies out of each respective range, a nonlinear wave-mixing signal similar to the curve 403 in FIG. 5 would result and the optical DSB-to-SSB conversion cannot be achieved. In the present embodiment, stable and successful optical DSB-to-SSB conversion can be achieved for a 4 range of 6 folds and for a $f_i$ range of 2 folds, from 15 to 31 GHz.

Figure 6A:
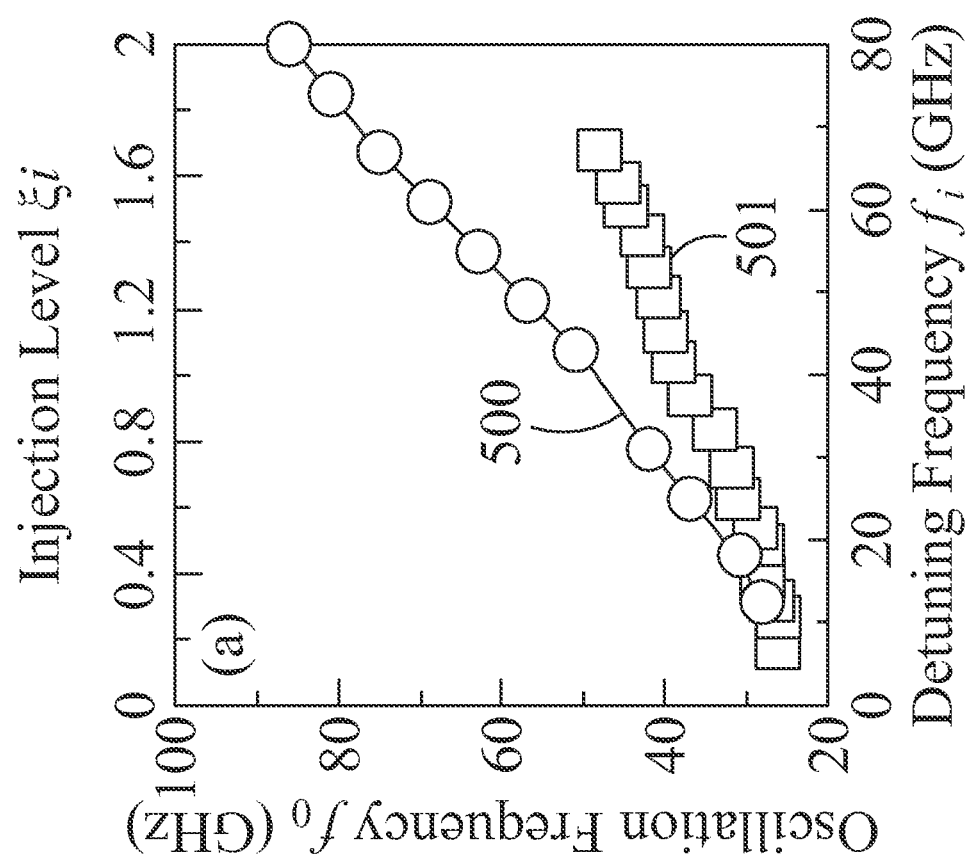
FIG. 6A shows the oscillation frequency ($f_0$) of the period-one (P1) nonlinear dynamics of the semiconductor laser as a function of the injection level ($\xi_i$) and detuning frequency ($f_i$) according to the present invention.
Figure 6B:
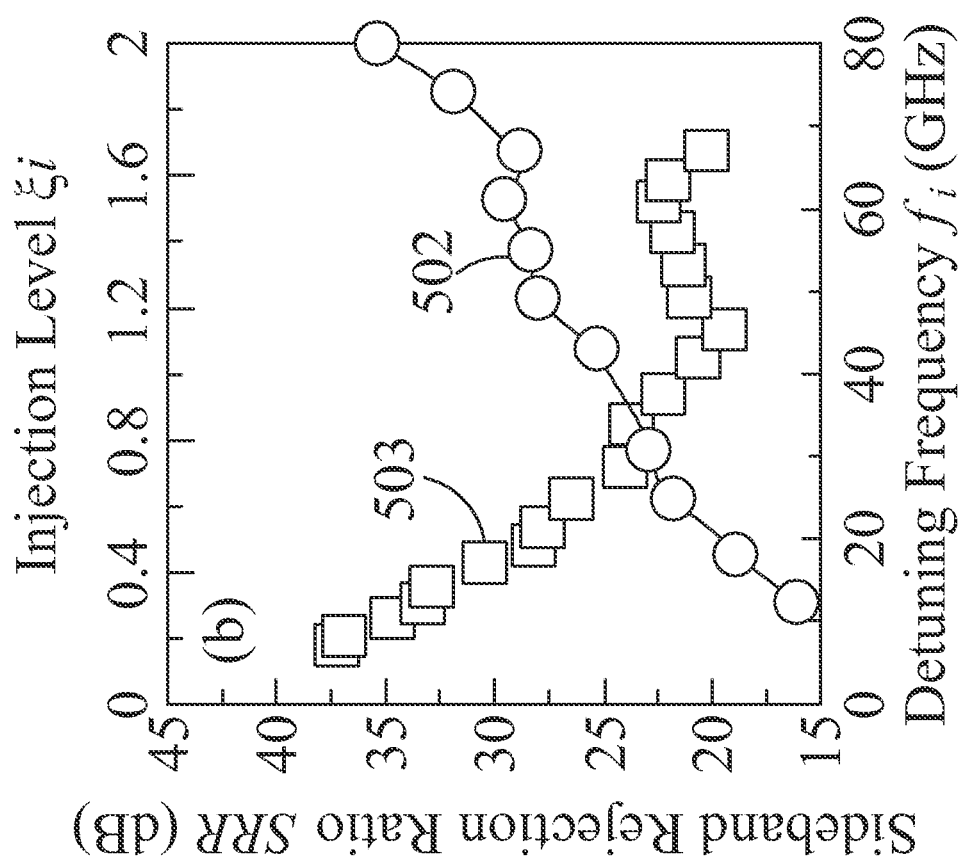
FIG. 6B shows the sideband rejection ratio (SRR) of the period-one (P1) nonlinear dynamics of the semiconductor laser as a function of the injection level ($\xi_i$) and detuning frequency ($f_i$) according to the present invention.

The curve 404 in FIG. 5C and the curve 406 in FIG. 5D demonstrate that a different $f_0$ value can be generated by properly adjusting either $\xi_i$ or/and $f_i$, which can be used to find a $f_0$ value that matches a specific $f_m$ value. Referring to FIG. 6A, FIG. 6A shows the oscillation frequency ($f_0$) of the period-one (P1) nonlinear dynamics of the semiconductor laser as a function of the injection level $\xi_i$ (curve 501) and detuning frequency $f_i$ (curve 500) according to the present invention. These results demonstrate that the device of the present invention enables optical DSB-to-SSB conversion for a very broad microwave frequency range, from a few GHz up to at least 80 GHz. Comparing the curve 202 in FIG. 3A, the curve 404 in FIG. 5C, and the curve 406 in FIG. 5D demonstrates that different values of SRR can be obtained for different P1 features under different values of $\xi_i$ and $f_i$. Referring to FIG. 6B, FIG. 6B shows the sideband rejection ratio (SRR) of the period-one nonlinear dynamics of the semiconductor laser as a function of the injection level $\xi_i$ (curve 503) and detuning frequency $f_i$ (curve 502) according to the present invention. These results demonstrate that, even under different values of $\xi_i$ and $f_i$, SRR can generally be kept beyond 20 dB. This ensures that, after conversion, the optical SSB is high enough to mitigate the microwave power fading effect over optical fiber distribution. To summarize, the present invention shall work for RoF networks adopting not only low microwave frequencies used for the current generation but also high microwave frequencies, such as from 10 GHz to 100 GHz or even higher, used for the next generations.

Figure 7:
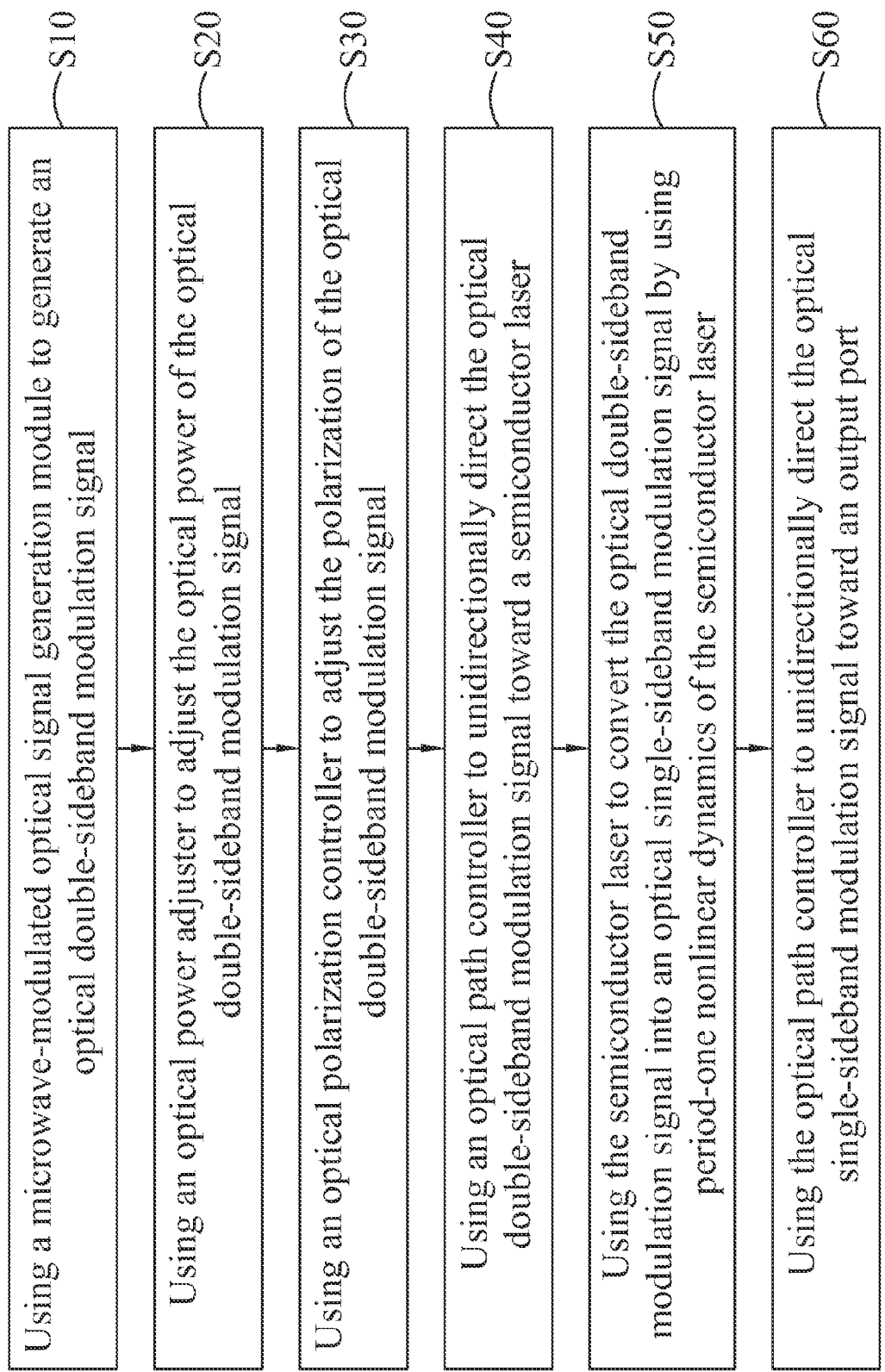
FIG. 7 is a first flow diagram showing a method for optical signal conversion according to a preferred embodiment of the present invention.

Referring to FIG. 7, FIG. 7 is a first flow diagram showing a method for optical signal conversion according to a preferred embodiment of the present invention. The optical signal conversion method of the present invention includes the following steps:

(S10): Using a microwave-modulated optical signal generation module to generate an optical double-sideband modulation (DSB) signal;

(S20): Using an optical power adjuster to adjust the optical power of the optical double-sideband modulation (DSB) signal;

(S30): Using an optical polarization controller to adjust the polarization of the optical double-sideband modulation (DSB) signal;

(S40): Using an optical path controller to unidirectionally direct the optical double-sideband modulation (DSB) signal toward a semiconductor laser;

(S50): Using the semiconductor laser to convert the optical double-sideband modulation (DSB) signal into an optical single-sideband modulation (SSB) signal by using period-one (P1) nonlinear dynamics of the semiconductor laser; and (S60): Using the optical path controller to unidirectionally direct the optical single-sideband modulation (SSB) signal toward an output port.

Figure 8:
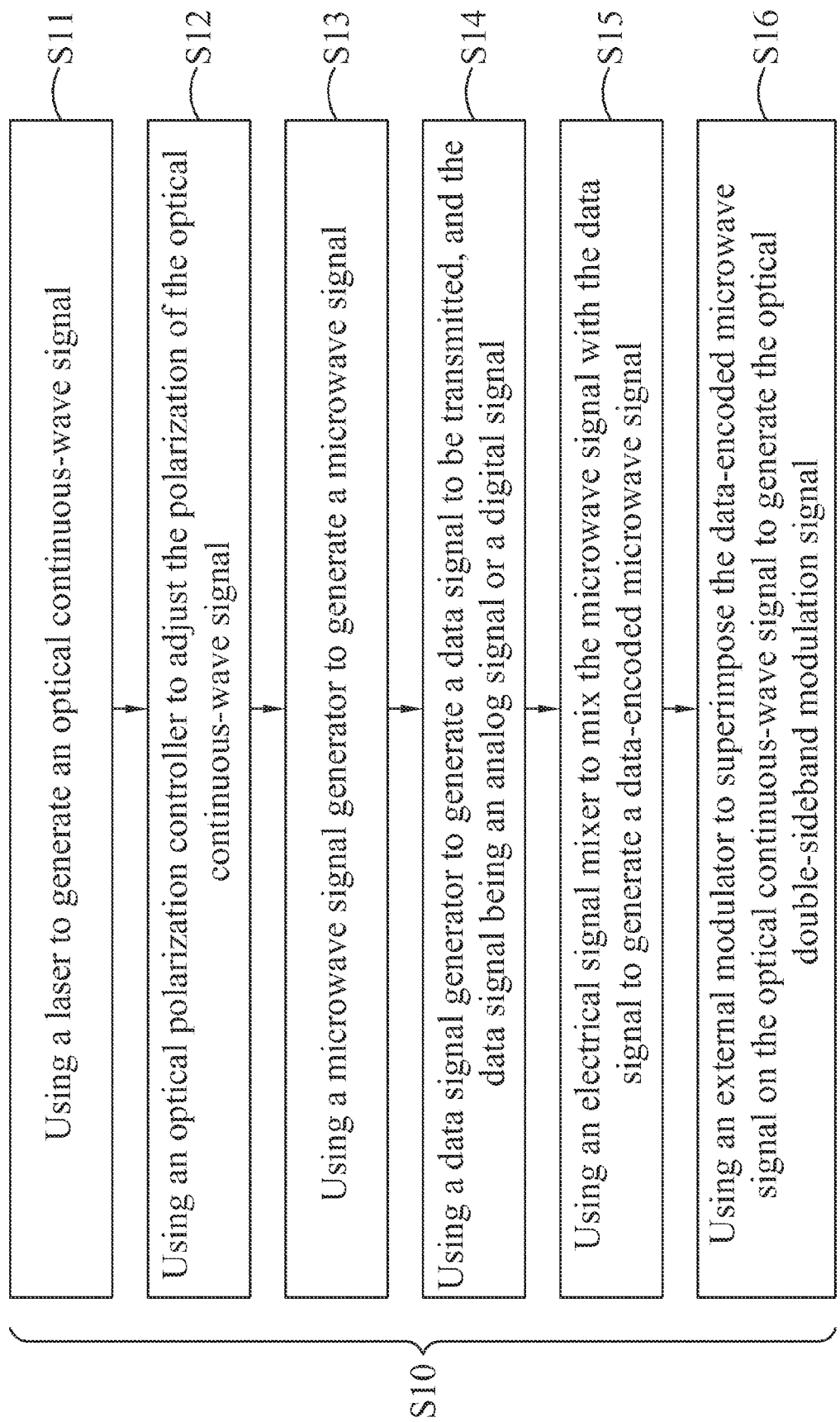
FIG. 8 is a second flow diagram showing the method for optical single conversion according to the preferred embodiment of the present invention.

Referring to FIG. 8, FIG. 8 is a second flow diagram showing the method for optical single conversion according to the preferred embodiment of the present invention. The step of S10 further comprises the following steps:

(S11): Using a laser to generate an optical continuous-wave (CW) signal;

(S12): Using an optical polarization controller to adjust the polarization of the optical continuous-wave (CW) signal;

(S13): Using a microwave signal generator to generate a microwave signal;

(S14): Using a data signal generator to generate a data signal to be transmitted, and the data signal being an analog signal or a digital signal;

(S15): Using an electrical signal mixer to mix the microwave signal with the data signal to generate a data-encoded microwave signal; and (S16): Using an external modulator to superimpose the data-encoded microwave signal on the optical continuous-wave (CW) signal to generate the optical double-sideband modulation (DSB) signal.

In summary, the present invention provides a device and a method for conversion from optical DSB signals to optical SSB signals by using P1 nonlinear dynamics of semiconductor lasers. Only a typical semiconductor laser is required as the key conversion unit for the device of the present invention, therefore making the device structure relatively simple. After conversion, the microwave and data quality are preserved or even enhanced, improving the detection sensitivity, transmission distance, and link gain of RoF networks. The optical DSB-to-SSB conversion works for a very broad microwave frequency range, from a few GHz up to at least 80 GHz, making the device of the present invention highly reconfigurable for different RoF networks adopting different operating microwave frequencies. In addition, the device of the present invention can stably operate to a high level when subject to ambient variation and can be self-adapted to changes in operating microwave frequencies. The advantageous characteristics of the present invention overcome certain problems and challenges encountered by other conversion methods, making the device of the present invention relatively simple, stable, and cost-effective.

If the optical power of the optical input is high enough so that the optical power amplifier is not necessary, the optical components used in the device of the present invention, including the optical power adjuster, the optical polarization controller, and the optical circulator, are mostly passive optical components which are all commercially available. Therefore, compared with other conversion methods, no complicated design, challenging fabrication, and expensive customization of optical components are required for the method of the present invention.

Based on the above demonstrations and explanations, the present invention has overcome certain technical limitations of prior arts and has made significant improvements. Moreover, it is not easy for the present invention to be conceived by those who are skilled in this technical area. Apparently, the novelty and practicability of the present invention have met the application requirements of a patent. The aforementioned preferred embodiment is used to explain the technical ideas and features of the present invention. The purpose is to enable those who are skilled in this technical area to understand and realize the present invention. It should be understood that the present invention is not limited to the details thereof. Various equivalent variations and modifications may still occur to those skilled in this art in view of the teachings of the present invention. Thus, all such variations and equivalent modifications are also embraced within the scope of the present invention as defined in the appended claims.

What is claimed is:

1. An optical signal conversion device, comprising:
an optical input, wherein the optical input is an optical double-sideband modulation signal, and wherein the optical double-sideband modulation signal is a microwave-modulated optical signal with two microwave modulation sidebands of equal power;
an optical output, wherein the optical output is an optical single-sideband modulation signal, and wherein the optical single-sideband modulation signal is a microwave-modulated optical signal with two microwave modulation sidebands of unequal power; and
an optical signal conversion module comprising a semiconductor laser to convert the optical input into the optical output using period-one nonlinear dynamics of the semiconductor laser, wherein the optical input falls within the domain for conversion from optical double-sideband modulation signals to optical single-sideband modulation signals using the period-one nonlinear dynamics of the semiconductor laser, wherein a microwave modulation frequency of the optical input falls within a certain range of a few tens of gigahertz around an oscillation frequency of the period-one nonlinear dynamics, wherein the certain range depends on the power of the microwave modulation sidebands of the optical input.

2. The optical signal conversion device of claim 1, further comprising a microwave-modulated optical signal generation module to generate the optical input, wherein the microwave-modulated optical signal generation module comprises:
a laser to generate an optical continuous-wave signal;
an optical polarization controller to adjust the polarization of the optical continuous-wave signal;

a microwave signal generator to generate a microwave signal; and an external modulator to superimpose the microwave signal on the optical continuous-wave signal to generate the optical input.

3. The optical signal conversion device of claim 2, wherein the microwave-modulated optical signal generation module further comprises:

a data signal generator to generate a data signal to be transmitted, and the data signal being an analog signal or a digital signal; and an electrical signal mixer to mix the microwave signal with the data signal to generate a data-encoded microwave signal.

4. The optical signal conversion device of claim 1, wherein the optical signal conversion module further comprises:

an optical power adjuster, comprising an active optical component or a passive optical component, to adjust the optical power of the optical input;

an optical polarization controller to adjust the polarization of the optical input; and an optical path controller, connected to the semiconductor laser, to unidirectionally direct the optical input toward the semiconductor laser, and to unidirectionally direct the optical output toward an output port.

5. The optical signal conversion device of claim 4, wherein the active optical component is an optical power amplifier, the passive optical component is an optical power attenuator, and the optical path controller is an optical circulator.

6. An optical signal conversion method, comprising steps of:

using a microwave-modulated optical signal generation module to generate an optical input, wherein the optical input is an optical double-sideband modulation signal, and wherein the optical double-sideband modulation signal is a microwave-modulated optical signal with two microwave modulation sidebands of equal power; and using a semiconductor laser to convert the optical input into an optical output by using period-one nonlinear dynamics of the semiconductor laser, wherein the optical output is an optical single-sideband modulation signal, wherein the optical single-sideband modulation signal is a microwave-modulated optical signal with two microwave modulation sidebands of unequal power, and the optical input falls within the domain for conversion from optical double-sideband modulation signals to optical single-sideband modulation signals using the period-one nonlinear dynamics of the semiconductor laser, wherein a microwave modulation frequency of the optical input falls within a certain range of a few tens of gigahertz around an oscillation frequency of the period-one nonlinear dynamics, wherein the certain range depends on the power of the microwave modulation sidebands of the optical input.

7. The optical signal conversion method of claim 6, wherein the step of using the microwave-modulated optical signal generation module to generate the optical input comprises steps of:

using a laser to generate an optical continuous-wave signal;

using an optical polarization controller to adjust the polarization of the optical continuous-wave signal;

using a microwave signal generator to generate a microwave signal; and using an external modulator to superimpose the microwave signal on the continuous-wave optical signal to generate the optical input.

8. The optical signal conversion method of claim 7, further comprising steps between the step of using the microwave signal generator to generate the microwave signal and the step of using the external modulator to superimpose the microwave signal on the optical continuous-wave signal to generate the optical input:

using a data signal generator to generate a data signal to be transmitted, and the data signal being either an analog signal or a digital signal; and using an electrical signal mixer to mix the microwave signal with the data signal to generate a data-encoded microwave signal.

9. The optical signal conversion method of claim 6, further comprising steps between the step of using the microwave-modulated optical signal generation module to generate the optical input and the step of using the semiconductor laser to convert the optical input into the optical output:

using an optical power adjuster to adjust the optical power of the optical input; and using an optical polarization controller to adjust the polarization of the optical input.

10. The optical signal conversion method of claim 6, wherein the step of using the semiconductor laser to convert the optical input into the optical output further comprises:

using an optical path controller to unidirectionally direct the optical input toward the semiconductor laser, and to unidirectionally direct the optical output toward an output port.

* * * * *